No. 675,445. Patented June 4, 1901.
A. W. LAWTON.
MANUFACTURE OF SALT.
(Application filed Oct. 23, 1900.)
(No Model.)
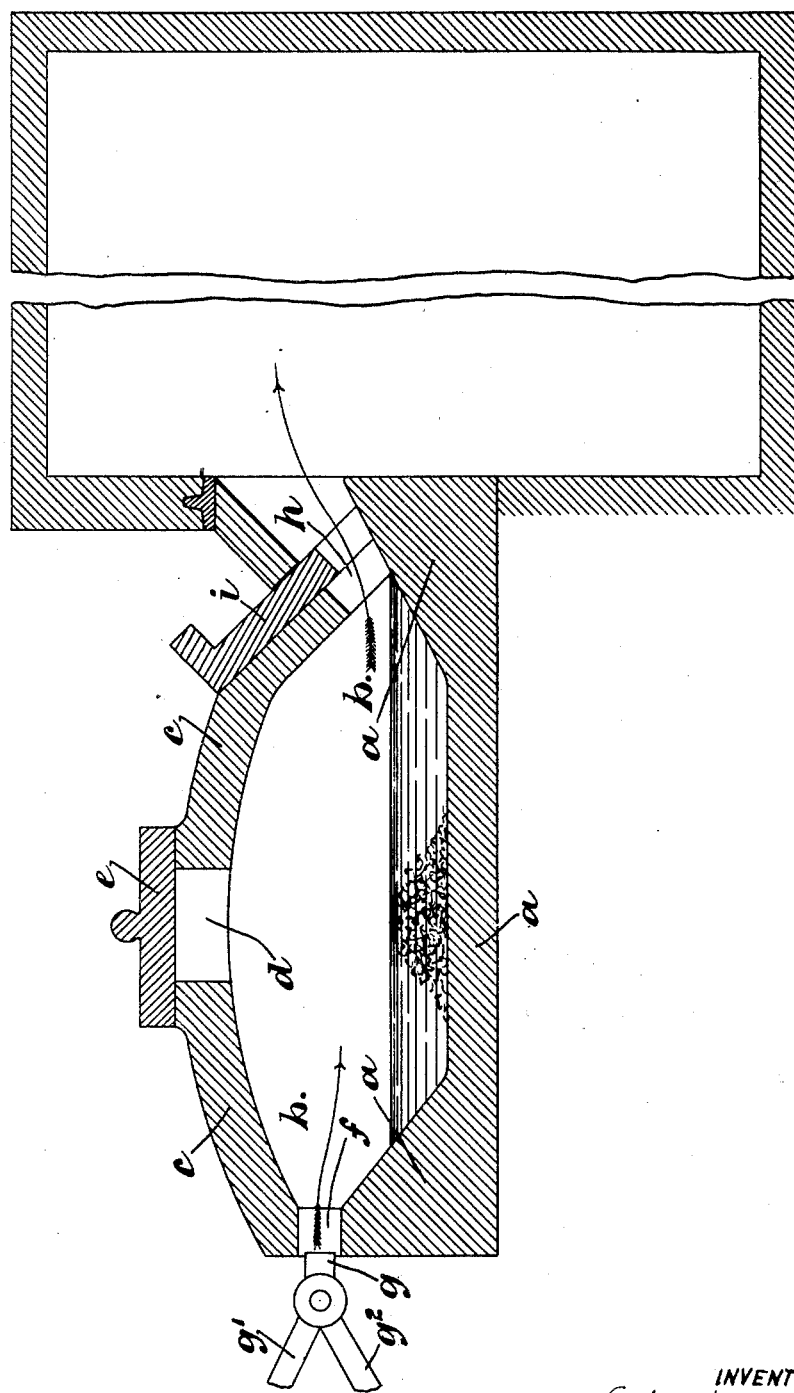

UNITED STATES PATENT OFFICE.

ARTHUR W. LAWTON, OF NEW YORK, N. Y.

MANUFACTURE OF SALT.

SPECIFICATION forming part of Letters Patent No. 675,445, dated June 4, 1901.

Application filed October 23, 1900. Serial No. 34,099. (No specimens.)

*To all whom it may concern:*

Be it known that I, ARTHUR WILLIAM LAWTON, a citizen of the Republic of the United States of America, and a resident of New York, State of New York, have invented certain new and useful Improvements in the Manufacture of Common Salt, of which the following is a specification.

This invention has reference to the process of manufacturing salt—*i. e.*, chlorid of sodium—wherein rock-salt containing its impurities or other impure salt is fused by heat in a furnace or receptacle of basic material or having a basic lining with the assistance of an alkaline substance and the impurities of the rock or other salt are separated or separate from the chlorid of sodium and deposit in the bottom of the receptacle or furnace.

The chief object and effect of the present invention is to provide an improvement or improvements in the said process of manufacturing salt whereby, first, salt of an absolute purity—namely, pure chlorid of sodium—is produced, and, secondly, it is produced in a finely-divided state; and, furthermore, by a single operation or single-stage process.

According to this invention the impure rock-salt (or other impure salt) is volatilized by heat in a furnace or receptacle, and the chlorid-of-sodium vapor is carried off by gaseous fluid from the receptacle or furnace as it is formed and collected, being thereby formed into small particles of spherical or more or less spherical form. These particles are of such a nature or have such characteristics that they will not absorb moisture, or absorb it to any material extent—that is, this salt is not hygroscopic.

A method of very simply and economically and effectively working this improved process consists in fusing and vaporizing salt in a closed or more or less closed furnace or vessel by gaseous fuel supplied above the level of the salt through a suitable opening or openings and under a pressure above that of the atmosphere and carrying off the salt-vapor by the gaseous products of combustion at another opening or openings—say opposite that or those of the gaseous-fuel supply. The combined discharge will be delivered into a suitable room or chamber, and the salt-vapor carried by the gaseous products will form itself or solidify into small spherical or more or less spherically-shaped particles or bodies and fall down. They thereby separate from the gaseous products of combustion, and these gases pass away by a suitable outlet or outlets, or where required. The impurities separated from the raw salt, which will be separated from the liquid slag at the bottom of the volatilizing receptacle or furnace, can be run out in liquid form therefrom, as and when desired, and be discharged by employing an oscillating or tilting furnace or vessel. A suitable and convenient form of furnace is one similar to a hearth or reverberatory furnace with an opening for introducing salt at the top and a controlling slab or door for regulating the discharge at one end for the escape of the combined fluids—namely, the gaseous products of combustion and salt-vapor. Such a furnace is shown in the drawing hereto annexed. In it $a$ is the hearth, adapted to hold the salt to be melted and the molten salt and having above it the chamber $b$, inclosed by the roof or covering $c$. $d$ is the opening, having the door $e$ above it, through which the rock-salt is fed.

$f$ is the opening for the entrance of the gaseous-fuel flame, $g$ being the twyer and $g'$ $g^2$ the air and gas supply pipes.

$h$ is the opening in the opposite end of the furnace to $f$, through which the discharge of salt-vapor and burned heating-gases are discharged, $i$ being the door by which the amount of opening for this discharge is regulated. The larger the discharge-opening the larger will be the grains of salt produced, and consequently the smaller this opening the smaller will be the salt-grains.

In carrying out my improved process the vaporization under pressure and high velocity is absolutely requisite to the production of useful results—namely, pure salt in a salable form. Without the pressure, as previously stated, the deposit takes place as snow, and the salt would become one mass and would be practically amorphous; but the production of the salt in granules of spherical form, which my process does, produces salt in a form which is useful, and this can only be done, so far as I aware of, by the method of discharging the gases charged with the salt-vapor under pressure and high velocity.

What is claimed in respect of the herein-described invention is—

The herein-described process of manufacturing pure salt in granules of substantially spherical form from rock-salt or other impure salt consisting in confining the impure salt, supplying a gaseous fuel thereto under pressure, and high velocity, whereby salt-vapor is formed, carrying off said vapor with the products of combustion under pressure and under a high velocity, and finally precipitating the granules of salt, substantially as described.

In witness whereof I have hereunto set my hand in presence of two witnesses.

ARTHUR W. LAWTON.

Witnesses:
  CLARA D. FROHBACH,
  ETHEL C. SMITH.